United States Patent
Hwang et al.

(10) Patent No.: US 9,588,865 B2
(45) Date of Patent: Mar. 7, 2017

(54) SYSTEM AND METHOD FOR DISPLAYING USAGE HISTORY OF APPLICATIONS EXECUTED BETWEEN DEVICES

(71) Applicant: Samsung Electronics Co., Ltd., Gyeonggi-do (KR)

(72) Inventors: Changhwan Hwang, Seoul (KR); Sahnghee Bahn, Gyeonggi-do (KR); Sungsoo Hong, Seoul (KR)

(73) Assignee: Samsung Electronics Co., Ltd (KR)

( * ) Notice: Subject to any disclaimer, the term of this patent is extended or adjusted under 35 U.S.C. 154(b) by 841 days.

(21) Appl. No.: 13/628,872

(22) Filed: Sep. 27, 2012

(65) Prior Publication Data

US 2013/0083059 A1    Apr. 4, 2013

(30) Foreign Application Priority Data

Sep. 29, 2011 (KR) .................. 10-2011-0098805

(51) Int. Cl.
*G06F 11/32* (2006.01)
*G06F 11/34* (2006.01)

(52) U.S. Cl.
CPC ........ *G06F 11/323* (2013.01); *G06F 11/3409* (2013.01); *G06F 11/3466* (2013.01)

(58) Field of Classification Search
CPC ......... G06T 11/60; G06T 19/00; G06T 11/00; H04M 15/58; G06F 3/04886
See application file for complete search history.

(56) References Cited

U.S. PATENT DOCUMENTS 7,685,035 B2 * 3/2010 Aoki .............................. 705/34
8,375,295 B2 * 2/2013 Zalewski et al. ............. 715/234
2002/0156825 A1 10/2002 Hoover, Jr. et al.
2005/0183143 A1 8/2005 Anderholm et al.
2007/0299845 A1 * 12/2007 Tokunaga ............. G06F 21/105
2008/0299951 A1 12/2008 Karkanias et al.
2009/0037529 A1 2/2009 Armon-Kest et al.
2011/0021243 A1 1/2011 Shin et al.
2011/0159854 A1 6/2011 Kedefors et al.

FOREIGN PATENT DOCUMENTS

JP       2003-115938    4/2003
JP       2010245632     10/2010
KR    1020100073526    7/2010

OTHER PUBLICATIONS

European Search Report dated Jul. 9, 2015 issued in counterpart application No. 12836856.0-1954, 7 pages.

* cited by examiner

*Primary Examiner* — Maurice L McDowell, Jr.

(74) *Attorney, Agent, or Firm* — The Farrell Law Firm, P.C.

(57) ABSTRACT

A system and method displaying usage histories of applications by devices on a network are provided. The method includes storing usage histories of applications that a first device has executed with a plurality of other devices through a network connection; setting, in the first device, at least one of a first mode and a second mode for displaying at least a part of the usage histories; displaying, if the first device is set in the first mode, usage histories of the executed applications arranged by device, with respect to the plurality of other devices; and displaying, if the first device is set in the second mode, usage histories of the plurality of other devices arranged by application, with respect to the executed applications.

18 Claims, 25 Drawing Sheets

FIG. 11A

| | 12:34 |
|---|---|
| Device 2<br><br>Streaming<br>Remote<br>Backup | Device 3<br><br><br><br>Streaming |
| Device 4<br><br>Streaming<br>Backup<br>Screen share | Device 5<br><br><br><br>Remote print |
| Device 6<br><br><br><br>Backup | Device 7<br><br><br><br>Streaming |

FIG. 11B

| 12:34 |
|---|
| Device 2 |
| Streaming/Remote/Backup |
| Device 3 |
| Streaming |
| Device 4 |
| Streaming/Backup/Screen share |
| Device 5 |
| Remote print |
| Device 6 |
| Backup |
| Device 7 |
| Streaming |

FIG. 12A

| | 12:34 |
|---|---|
| Streaming<br><br>Device2<br>Device3<br>Device4 | Remote<br><br><br><br>Device2 |
| Backup<br><br><br>Device2<br>Device4 | Remote Print<br><br><br>Device5<br>Device6 |
| Screen Share<br><br><br>Device4 | Zone Detection<br><br><br>Device7 |

FIG. 12B

| | 12:34 |
|---|---:|
| Streming | |
| Device2/Device3/Devcie4 | |
| Remote | |
| Device2 | |
| Backup | |
| Device2/Device4 | |
| Remote Print | |
| Device5/Device6 | |
| Screen Share | |
| Device4 | |
| Zone Detection | |
| Device7 | |

| SEQUENCE TABLE | | | | |
|---|---|---|---|---|
| ID | EXECUTION TIME | APPLICATION ID | DEVICE ID1 | DEVICE ID2 |
| 1 | 12:00:00 | 1 | 2 | 3 |
| 2 | 12:30:00 | 1 | 2 | - |
| 3 | 16:00:01 | 3 | 2 | 4 |
| ... | ... | ... | ... | ... |

1812 → row 1
1814 → row 2
1816 → row 3

SYSTEM AND METHOD FOR DISPLAYING USAGE HISTORY OF APPLICATIONS EXECUTED BETWEEN DEVICES

PRIORITY

This application claims priority under 35 U.S.C. §119(a) to a Korean patent application filed on Sep. 29, 2011 in the Korean Intellectual Property Office and assigned Serial No. 10-2011-0098805, the entire content of which is incorporated herein by reference.

BACKGROUND OF THE INVENTION

1. Field of the Invention

The present invention relates generally to a system and method for displaying usage histories, and more specifically, to a system and method for displaying a usage history of at least one application executed with a plurality of other devices.

2. Description of the Related Art

Users of devices may each execute a number of applications in their own respective device and perform tasks corresponding to the execute applications. If users would like to execute the more various jobs, the user may execute applications across a plurality of devices or a plurality of applications in at least one device. However, employing a plurality of devices and a plurality of applications causes an increase in job complexity and may lead repetition of the same job.

Therefore, there is a need for a system that can reduce the number of jobs repeatedly executed by a user, so that the user can easily use the device.

SUMMARY OF THE INVENTION

The present invention has been made in view of the above problems, and provides a system and method that can allow a user to easily and rapidly process his/her requested jobs, using a user's usage history of a number of applications executed in a number of devices.

In accordance with an aspect of the present invention, a method for displaying usage histories of applications executed by devices on a network is provided. The method includes storing the usage histories of applications that the first device executed, with the connection with a number of devices; setting a first or second mode for displaying at least part of the usage histories to the first device; displaying, if the first device is set in a first mode, the usage histories of applications by devices that the first device executed, with respect to the respective devices; and displaying, if the first device is set in a second mode, the usage histories of devices by applications that the first device connected to, with respect to the respective executed applications.

In accordance with another aspect of the present invention, a method for displaying usage histories of applications executed by devices on a network is provided. The method includes storing the usage histories of applications that the first device executed, with the connection with a number of devices; displaying the usage histories of applications by devices that the first device executed, with respect to the respective devices; selecting one of a number of devices; and displaying detail usage histories of one or more applications executed between the first device and the selected device.

In accordance with another aspect of the present invention, a method for displaying usage histories of applications executed by devices on a network is provided. The method includes storing the usage histories of applications that the first device executed, with the connection with a number of devices; displaying the usage histories of devices by applications that the first device connected to, with respect to the respective executed applications; selecting one of a number of applications; and displaying detail usage histories of one or more devices connected to the first device, with respect to the selected application.

In accordance with another aspect of the present invention, a method for displaying usage histories of applications executed by devices on a network is provided The method includes storing the usage histories of applications that the first device executed, with the connection with a number of devices; and displaying the usage histories of applications by devices that the first device executed, with respect to the respective devices and/or the usage histories of devices by applications that the first device connected to, with respect to the respective executed applications.

In accordance with another aspect of the present invention, a system for displaying usage histories of applications executed by devices on a network is provided. The system includes a storage unit for storing the usage histories of applications that the first device executed, with the connection with a number of devices; a controller for setting a first or second mode for displaying at least part of the usage histories to the first device and for providing the usage histories of applications by devices that the first device executed, with respect to the respective devices, in a first mode, and the usage histories of devices by applications that the first device connected to, with respect to the respective executed applications, in a second mode; and a display unit for displaying the usage histories of applications by devices or the usage histories of devices by applications.

In accordance with another aspect of the present invention, a system for displaying usage histories of applications executed by devices on a network is provided. The system includes a storage unit for storing the usage histories of applications that the first device executed, with the connection with a number of devices; a controller for providing the usage histories of applications by devices that the first device executed, with respect to the respective devices and detail usage histories of one or more application executed between the first device and one selected from a number of devices; and a display unit for displaying the detail usage histories.

In accordance with another aspect of the present invention, a system for displaying usage histories of applications executed by devices on a network is provided. The system includes a storage unit for storing the usage histories of applications that the first device executed, with the connection with a number of devices; a controller for providing the usage histories of devices by applications that the first device connected to, with respect to the respective executed applications, and detail usage histories of one or more devices connected to the first device, with respect to one selected from a number of applications; and a display unit for displaying the detail usage histories.

In accordance with another aspect of the present invention, a system for displaying usage histories of applications executed between a first device and a number of devices on a network is provided. The system includes a storage unit for storing the usage histories of applications that the first device executed, with the connection with a number of devices; a controller for providing: the usage histories of applications by devices that the first device executed, with respect to the respective devices and/or the usage histories of devices by applications that the first device connected to, with respect to the respective executed applications; and a display unit for displaying the usage histories.

In accordance with another aspect of the present invention, a computer-readable recording medium on which is recorded a program for displaying usage histories of applications executed by devices on a network is provided. The program includes storing the usage histories of applications that the first device executed, with the connection with a number of devices; and displaying the usage histories of applications by devices that the first device executed, with respect to the respective devices and/or the usage histories of devices by applications that the first device connected to, with respect to the respective executed applications.

BRIEF DESCRIPTION OF THE DRAWINGS

The features and advantages of the invention will become more apparent from the following detailed description in conjunction with the accompanying drawings, in which:

FIGS. 11A to 11B are diagrams illustrating screens showing usage histories of applications arranged by device, according to an embodiment of the invention;

FIGS. 12A to 12B are diagrams illustrating screens showing usage histories of devices arranged by application, according to an embodiment of the invention;

FIG. 18 is a diagram illustrating a table describing usage histories of a device, according to an embodiment of the invention;

DETAILED DESCRIPTION OF EMBODIMENTS OF THE PRESENT INVENTION

Hereinafter, embodiments of the present invention are described in detail with reference to the accompanying drawings. Detailed descriptions of well-known functions and structures incorporated herein may be omitted to avoid obscuring the subject matter of the invention.

Figure 1:
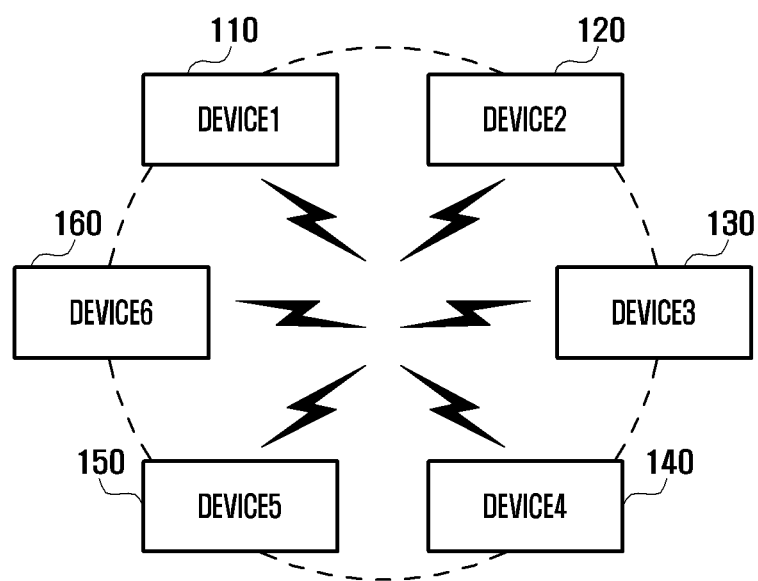
FIG. 1 is a diagram illustrating a configuration of a network according to an embodiment of the invention.

FIG. 1 is a diagram illustrating a configuration of a network according to an embodiment of the present invention.

Referring to FIG. 1, the network includes a number of devices 110, 120, . . . , 160 communicating with each other. The devices may be smart phones, Personal Computers (PCs), desktop PCs, digital cameras, digital photo frames, Digital TeleVisions (DTVs), set-top boxes, laptop computers, etc. According to an embodiment of the invention, the network is based on the Digital Living Network Alliance (DLNA) communication standard. However, embodiments of the present invention are not limited to networks based upon DLNA, and other networks may be used in accordance with embodiments of the present invention.

The devices 110, 120, . . . , 160 can serve as senders and/or receivers according to the movement direction of digital contents and their control directions. For example, senders transmit, to receivers, previously-stored or newly-created contents or data corresponding to an application. Senders also transmit data for controlling devices to receivers.

Receivers reproduce and process or store digital contents from senders. Receivers also execute a function or provide a User Interface (UI), by using the received data corresponding to an application. Receivers are controlled according to control data from senders.

When the devices are networked according to the DLNA standard, the devices can serve as Digital Media Servers (DMSs), Digital Media Renderers (DMRs), or Digital Media Controllers (DMCs). DMSs serve to transmit their stored digital contents to the other devices. DMRs serve to reproduce digital contents received from DMSs. DMCs perform remote control operations in order to transmit digital contents from DMSs to DMRs. DMCs may also control additional devices instead of DMSs and DMRs. Alternatively, DMSs and DMRs may also perform the functions of DMCs. In general, DMSs or DMCs serve as senders and DMRs serve as receivers; however, DMCs and/or DMRs can also be set such that their sending and receiving functions are performed by the other devices. For example, if a DMS stores meta-data, the DMS can serve as a receiver and receive contents related to the meta-data.

Although the following embodiments of the present invention are described based on the network shown and described with respect to FIG. 1, embodiments of the present invention may also be applied to networks where part or all of the devices of FIG. 1 are replaced with other devices. In addition, although the devices in the network shown in FIG. 1 wirelessly communicate with each other, the devices can also communicate each other over a wired connection.

Figure 2:
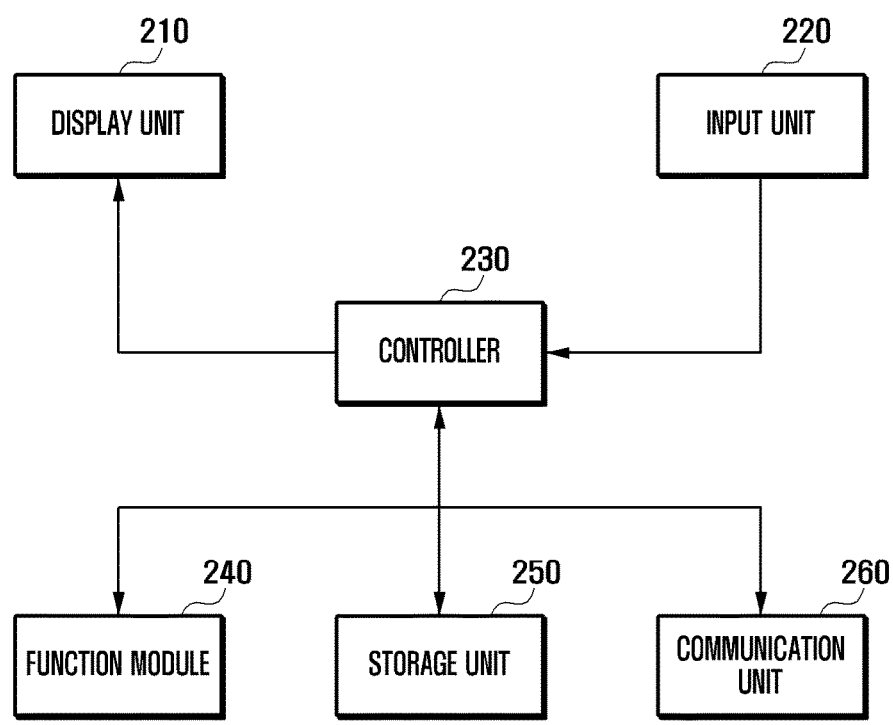
FIG. 2 is a diagram illustrating a schematic block diagram of a device according to an embodiment of the invention.

FIG. 2 illustrates a schematic block diagram of one of the devices shown in FIG. 1.

Referring to FIG. 2, the device includes a display unit 210, an input unit 220, a controller 230, a function module 240, a storage unit 250, and a communication unit 260. In accordance with other embodiments of the present invention, such a device may omit part of the components listed above and/or may include other additional components.

The function module 240 performs a number of functions of the device. For example, if the device is a smart phone, the function module 240 can perform a phone function and a Short Messaging Service (SMS) function. If the device is a digital camera, the function module 240 can take pictures/videos and reproduce them. If the device is a Digital TeleVision (DTV), the function module 240 can receive and reproduce broadcasts.

The display unit 210 displays the results of functions executed via the function module 240 and the controller 230. The display unit 210 may be implemented with a Liquid Crystal Display (LCD), an Organic Light Emitting Diode (OLED), an electrophoretic display, etc.

The storage unit 250 stores programs required for operations according to embodiments of the present invention. The storage unit 250 also stores applications/application programs and digital contents related to embodiments of the present invention. The storage unit 250 stores the usage history of at least one application executed in a number of devices. The storage unit 250 may include, for example, Static Random Access Memory (SRAM), Dynamic Random Access Memory (DRAM), Read Only Memory (ROM), Flash memory, a hard disk, a Secure Digital Memory Card (SDMC), a Multi-Media Card (MMC), an optical disk, a magneto-optical disk, a hologram memory, etc. However, it should be understood that embodiments of the present invention are not limited to the types of storage units listed above.

The input unit 220 allows the user to input commands. The input unit 220 may include, for example, a device having buttons, a keyboard, a mouse device, a touch pad, etc., that receives a user's commands. The input unit 220 may also include a touch screen input device combined with the display unit 210.

The communication unit 260 communicates with other devices via the network. The communication unit 260 serves as a module that performs network communication based on DLNA.

The controller 230 controls the overall operations of the device. The controller 230 sets up a mode for displaying usage history. In particular, the controller 230 controls display of usage histories of applications arranged by device or usage histories of devices arranged by application, according to the set mode.

Methods according to embodiments of the present invention may be implemented through software that is installed in the storage unit 250 and/or hardware.

Embodiments of the present invention are described as follows based on the display of the usage history of applications executed between the first device 110 and the other devices over the network. Although the following description refers to first device 110 as an example, other devices each may also operate in place of the first device 110 in accordance with embodiments of the present invention.

Figure 3:
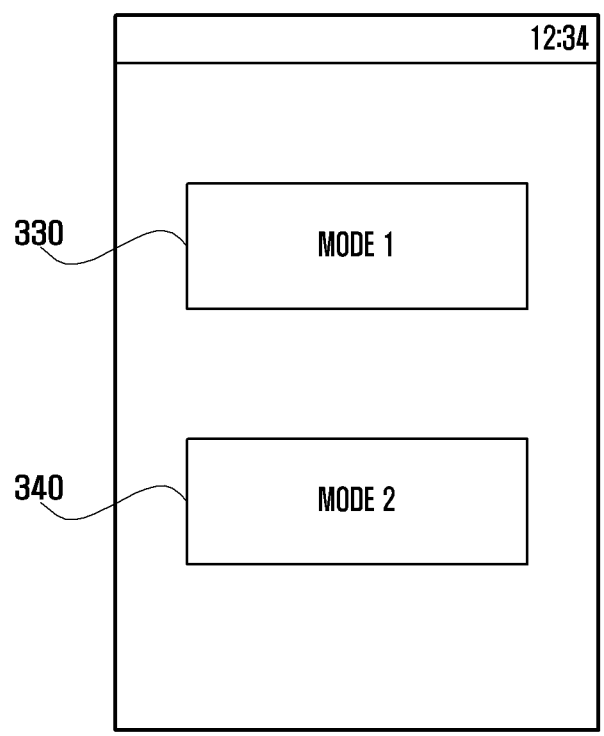
FIG. 3 is a diagram illustrating a screen showing the mode option to display usage history, according to an embodiment of the invention.

FIG. 3 is a diagram illustrating a screen showing the mode option to display usage history, according to an embodiment of the present invention Referring to FIG. 3, the first device 110 displays a mode option screen for allowing the user to set up one of the modes where at least part of usage history connected to the other devices is displayed. For example, the first device 110 may display a mode option screen showing a first mode 330 and a second mode 340 on the display unit 210. The first device 110 sets up one of the modes 330 and 340 to display a usage history, according to the user's selection. According to an embodiment of the invention, the first device 110 displays a usage history of applications arranged by device, in the first mode 330, and a usage history of devices arranged by application in the second mode 340. The location of the modes 330 and 340 displayed on the display unit 210 is not limited to the arrangement shown in FIG. 3. If one of the first 330 and second 340 modes is preset in the first device 110, the first device 110 can display the usage history according to the preset mode on the display unit 210, without displaying the mode option screen.

Figure 4:
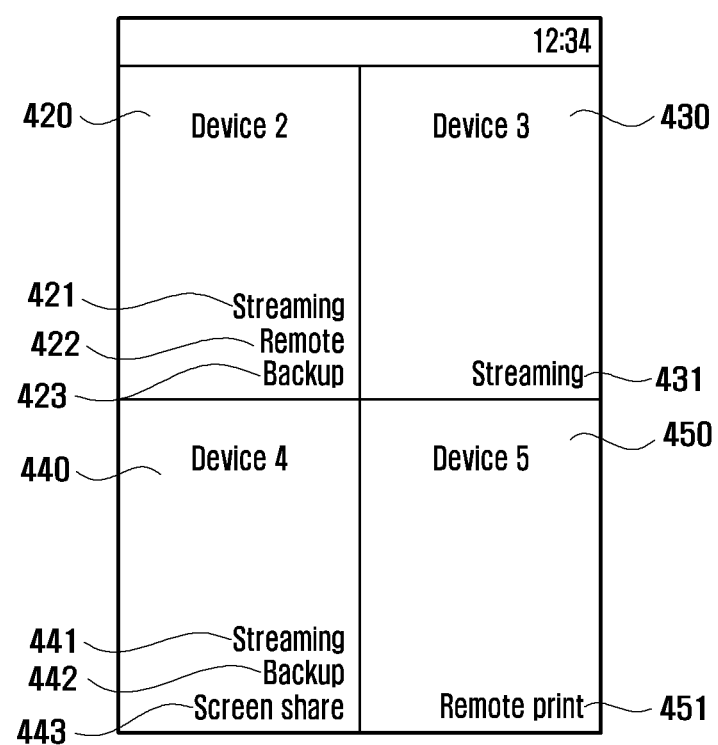
FIG. 4 is a diagram illustrating a screen showing usage histories of applications arranged by device, according to an embodiment of the invention.

FIG. 4 is a diagram illustrating a screen showing usage histories of applications arranged by device, according to an embodiment of the present invention.

FIG. 4 illustrates an example where the first mode 330 is selected on the mode option screen in the first device 110 according to an embodiment of the present invention.

Referring to FIG. 4, the first device 110 displays the usage histories of a number of applications that the first device 110 has executed with respect to the devices. The usage histories of applications arranged by device are displayed on corresponding regions of the display unit 210 respectively. In the embodiment, the first device 110 serves as a sender, and at least one of the other connected devices serves as a receiver.

Region 420 displays a usage history of applications executed between the first device 110 and the second device 120. Usage history 421 indicates that the first device 110 streams digital contents stored in the first device 110, to the second device 120 in a streaming mode for reproduction in the second device 120 via the streaming application. Usage history 422 indicates that the first device 110 controls the second device 120 to operate a function via the remote application. Usage history 423 indicates that the first device 110 backs up the other party's data to the first device 110 or the second device 120, via the backup application.

Region 430 displays a usage history of applications executed between the first device 110 and the third device 130. Usage history 431 indicates that the first device 110 streams digital contents stored in the first device 110, in the third device 130 in a streaming mode for reproduction in the third device 130 via the streaming application.

Region 440 displays a usage history of applications executed between the first device 110 and the fourth device 140. Usage history 441 indicates that the first device 110 streams digital contents stored in the first device 110, in the fourth device 140 in a streaming mode for reproduction in the fourth device 140 via the streaming application. Usage history 442 indicates that the first device 110 backs up the other party's data to the first device 110 or the fourth device 140, via the backup application. Usage history 443 indicates that the first device 110 sends information displayed on its display unit to the display unit of the fourth device 140, via the screen sharing application.

As shown in FIG. 4, region 450 displays a usage history of applications executed between the first device 110 and the fifth device 150. Usage history 451 indicates that the first device 110 prints the data via the fifth device 150, via the remote print application.

Figure 5:
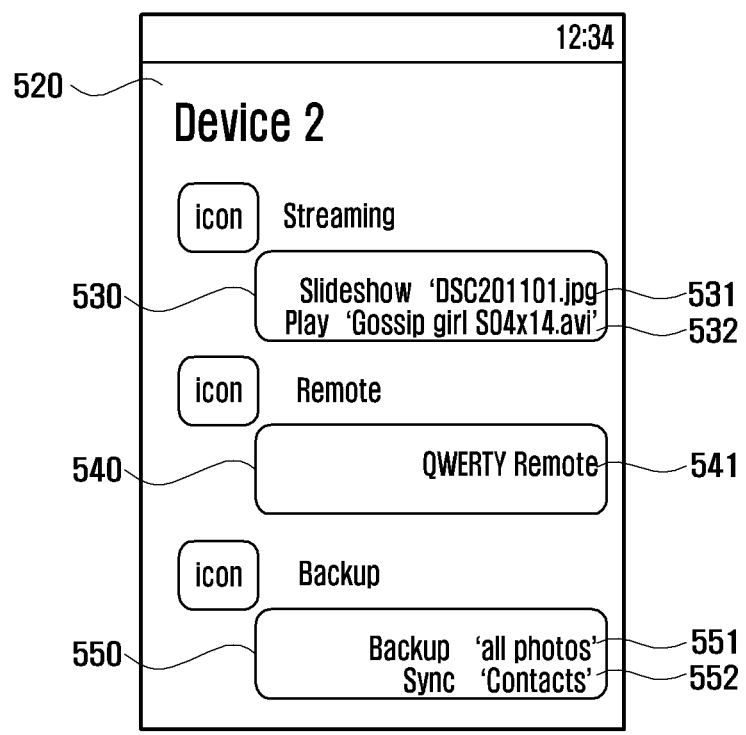
FIG. 5 is a diagram illustrating a screen showing detailed usage histories of applications arranged by device, according to an embodiment of the invention.

FIG. 5 illustrates a screen showing detailed usage histories of applications corresponding a device, according to an embodiment of the present invention.

FIG. 5 shows a detailed usage history screen when one of the regions 420, 430, 440 and 450 on the display unit shown in FIG. 4 is selected. When the user selects region 420, the first device 110 displays a detailed usage history screen 520 showing a detailed usage history of at least one application executed between the first device 110 and the second device 120.

Reference number 530 indicates a list of detailed usage histories corresponding to a streaming application executed the first device 110. Detailed usage history 531 indicates that digital contents are transmitted from the first device 110 to the second device 120 in a streaming mode and reproduced in a slideshow mode in the second device 120. Detailed usage history 532 indicates that digital contents are transmitted from the first device 110 to the second device 120 in a streaming mode and reproduced in a video playback mode in the second device 120.

Reference number 540 indicates a list of detailed usage histories corresponding to a remote application executed the first device 110. Detailed usage history 541 indicates that the first device 110 controls the second device 120 to operate a function, via the QWERTY keypad.

Reference number 550 indicates a list of detailed usage histories corresponding to an application in which the first device 110 backs up another party's data to the first device 110 or 120. Detailed usage history 551 indicates that the first device 110 backs up data related to pictures to the second device 120. Detailed usage history 552 indicates that the first and second devices 110 and 120 back up the each other's contacts and are synchronized with each other.

Figure 6:
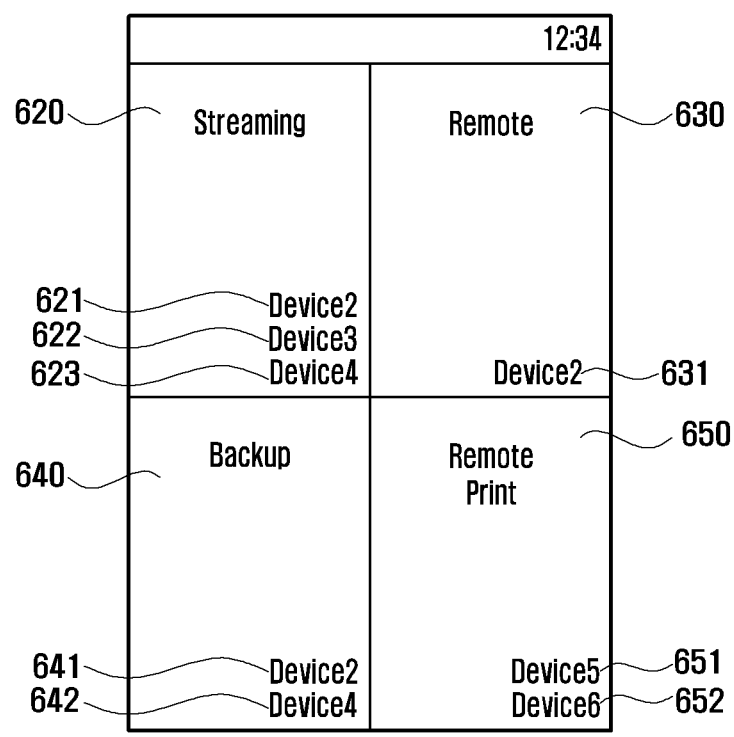
FIG. 6 is a diagram illustrating a screen showing usage histories of devices arranged by application, according to an embodiment of the invention.

FIG. 6 illustrates a screen showing usage histories of devices arranged by application, according to an embodiment of the present invention The display screen depicted in FIG. 6 corresponds to a case where the second mode 340 is selected on the mode option screen in the first device 110. In such a case, the first device 110 displays the usage histories of devices by applications that the first device 110 has executed with the connection to a number of devices. The usage histories of devices arranged by application are displayed on corresponding regions of the display unit 210, respectively. In the example according to FIG. 6, the first device 110 serves as a sender, and at least one of the other devices serves as a receiver.

Region 620 displays a usage history of a streaming application that is executed in the first device 110. Usage histories 621, 622, and 623 indicate that the digital contents stored in the first device 110 are reproduced in the second through fourth devices 120, 130, and 140, respectively, in a streaming mode.

Region 630 displays a usage history of a remote application that is executed in the first device 110. Usage history 631 indicates that the first device 110 controls the second device 120 to perform a function via a remote command.

Region 640 displays a usage history of a backup application that is executed in the first device 110. Usage history 641 indicates that the first device 110 backs up the other party's data to the first device 110 or the second device 120. Likewise, usage history 642 indicates that the first device 110 backs up the other party's data to the first device 110 or the fourth device 140.

Region 650 displays a usage history of a remote print application that is executed in the first device 110. Usage histories 651 and 652 indicate that the first device 110 printed the data via the fifth and sixth devices 150 and 160.

Figure 7:
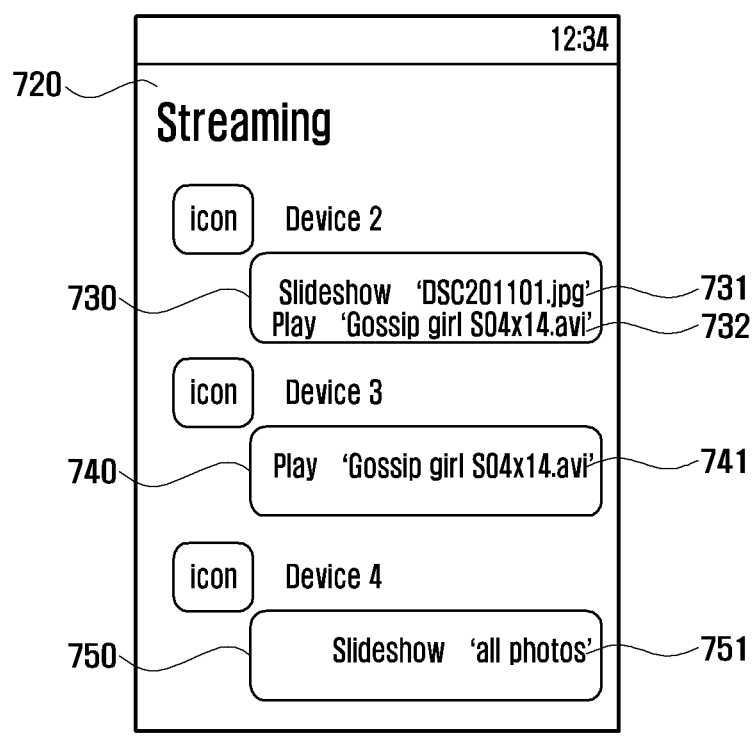
FIG. 7 is a diagram illustrating a screen showing detailed usage histories of devices arranged by application, according to an embodiment of the invention.

FIG. 7 is a diagram illustrating a screen showing detailed usage histories of devices by applications, according to an embodiment of the present invention.

Referring to FIG. 7, a detailed usage history screen is shown when one of the regions 620, 630, 640 and 650 on the display unit shown in FIG. 6 is selected. For example, when the user selects region 620, the first device 110 displays a detailed usage history screen 720 showing a detailed usage history of a streaming application that the first device 110 executed through the connection with the second, third, and fifth devices 120, 130 and 150.

Reference number 730 indicates a list of detailed usage histories where digital contents stored in the first device 110 are reproduced in the second device 120 in a streaming mode. Detailed usage history 731 indicates that digital contents are transmitted from the first device 110 to the second device 120 in a streaming mode and reproduced in a slideshow mode in the second device 120. Detailed usage history 732 indicates that digital contents are transmitted from the first device 110 to the second device 120 in a streaming mode and reproduced in a video playback mode in the second device 120.

Reference number 740 indicates a list of detailed usage histories where digital contents stored in the first device 110 are reproduced in the third device 130 in a streaming mode. Detailed usage history 741 indicates that digital contents are transmitted from the first device 110 to the third device 130 in a streaming mode and reproduced in a video playback mode in the third device 130.

Reference number 750 indicates a list of detailed usage histories where digital contents stored in the first device 110 are reproduced in the fourth device 140 in a streaming mode. Detailed usage history 751 indicates that digital contents are transmitted from the first device 110 to the fourth device 140 in a streaming mode and reproduced in a slideshow mode in the fourth device 140.

Figure 8:
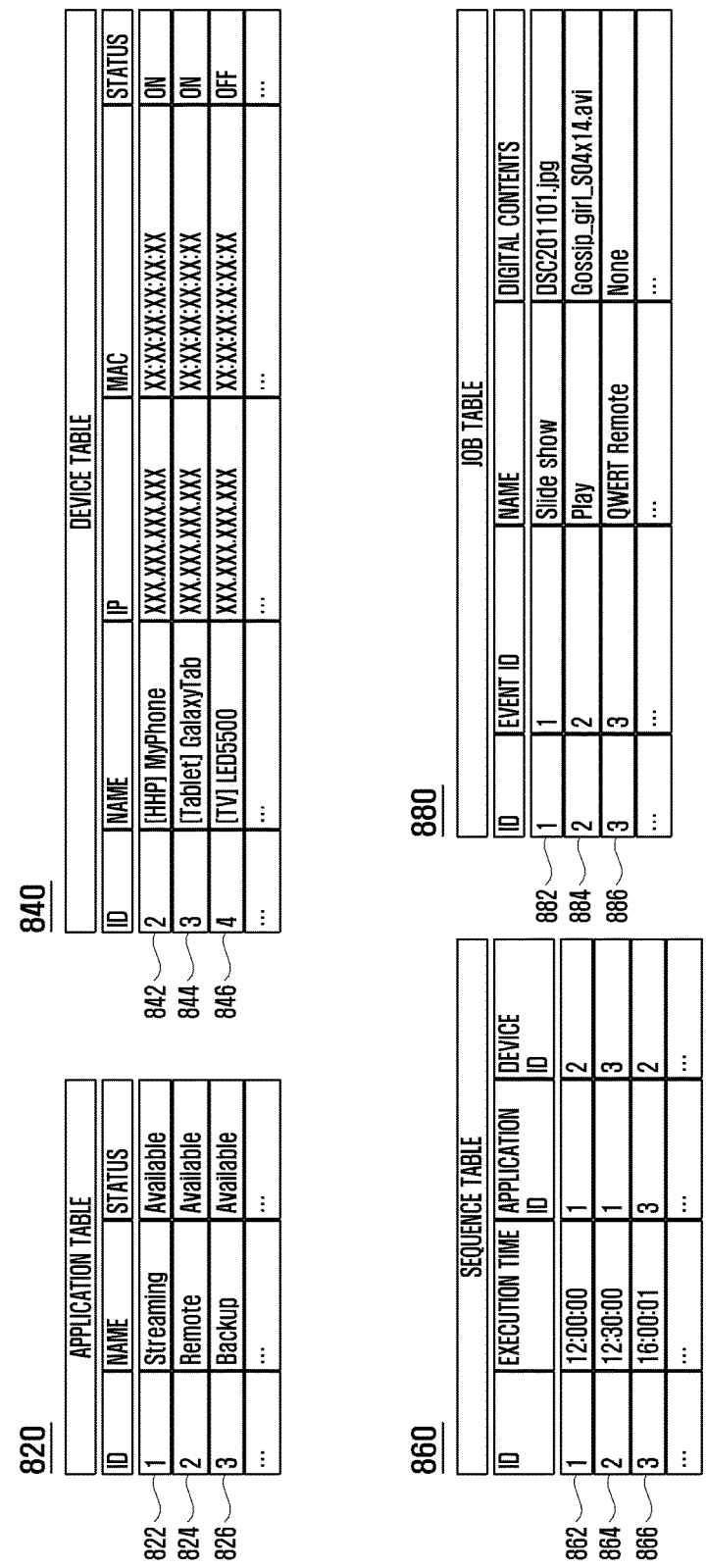
FIG. 8 is a diagram illustrating tables showing usage histories of a device, according to an embodiment of the invention.

FIG. 8 is a diagram illustrating tables showing usage history of a device, according to an embodiment of the present invention.

Referring to FIG. 8, tables of the storage unit 250 where the first device 110 stores usage histories are depicted. Other devices connected to the network also store usage histories in similar tables, in their own respective storage units.

Table 820 includes a listing of applications that the first device 110 has executed through the connection with the other devices. Application table 820 includes one or more applications 822, 824, and 826, as records, and each record has an IDentification number (ID), name, and status of an application. For example, application 822 has application ID '1,' application name 'Streaming,' and status 'Available.'

Table 840 includes a listing of devices that can be connected to the first device 110 on the network. Device table 840 includes one or more devices 842, 844, and 846, as records, and each record has an ID, a name, an Internet Protocol (IP) address, a Media Access Control (MAC) address, and a status of a device. For example, device 842 has ID '2,' name 'Hand Handle Phone (HHP) Myphone,' IP address and MAC address as an inherently allocated addresses to the Myphone, and status of a device 'ON' indicating that the device is available.

Table 860 includes a listing of the events and the sequence occurring when the first device 110 has executed corresponding applications with the other connected devices. Sequence table 860 includes events 862, 864, and 866, as records, and each record has an event ID, an application execution time, an application ID, and a device ID. For example, according to event 862 of event ID '1', the first device 110 executes an application, the ID of 1, at time, 12:00:00, and is connected to a device, the ID of 2. Referring to application table 820 and device table 840, according to event 862, digital contents are transmitted from the first device 110 to device ID of 2, i.e., Myphone, via an application, the ID of 1, i.e., a streaming mode, at time 12:00:00, and reproduced in a slideshow mode in the Myphone.

Table 880 stores detailed usage histories of applications that the first device 110 has executed through the connection of the other devices. Job table 880 includes jobs 882, 884, and 886, as records, and each record has a job ID, an event ID in the sequence table, a job name, and information regarding digital content. For example, according to job 882, the ID of '1,' digital contents are reproduced in the Myphone via a streaming application, in a slideshow mode, at time corresponding to the event ID of 1, i.e., 12:00:00.

Figure 9:
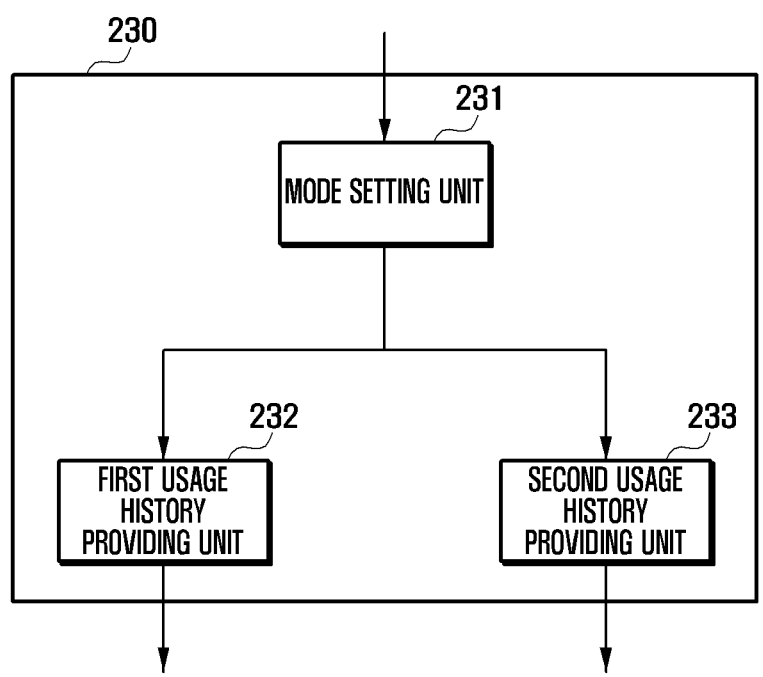
FIG. 9 is a diagram illustrating a detailed view of a controller according to an embodiment of the invention.

FIG. 9 is a diagram illustrating a detailed view of a controller according to an embodiment of the present invention.

Referring to FIG. 9, the controller 230 includes a mode setting unit 231, a first usage history providing unit 232, and a second usage history providing unit 233.

The mode setting unit 231 sets up a mode for displaying usage history according to a user's command input to the input unit 220. Alternatively, if a mode for displaying usage history was preset in the first device 110, the mode setting unit 231 can execute display of the usage history without requiring a user's command.

The first usage history providing unit 232 creates usage histories of applications arranged according to devices that the first device 110 has executed through the connection with a number of devices, based on the usage histories stored in the storage unit 250. For example, the first usage history providing unit 232 sorts usage histories with respect to device IDs, using the sequence table stored in the storage unit 250, extracts application IDs corresponding to the device IDs, and creates usage histories of applications arranged by device. The first usage history providing unit 232 provides the created usage histories of applications arranged by device to the display unit 210, according to the mode set by the mode setting unit 231.

The second usage history providing unit 233 creates usage histories of devices arranged according to applications that the first device 110 executed with respect to a number of applications, based on the usage histories stored in the storage unit 250. For example, the second usage history providing unit 233 sorts usage histories with respect to application IDs, using the sequence table stored in the storage unit 250, extracts device IDs corresponding to the application IDs, and creates usage histories of devices arranged by application.

At least one of the first and second usage history providing units 232 and 233 creates the usage history of applications arranged by device or the usage history of devices arranged by application, respectively before the mode setting unit 231 sets up a mode for displaying usage history, and then provides the created usage history to the display unit 210 according to the mode set by the mode setting unit 231.

Alternatively, after the mode setting unit 231 sets up a mode for displaying usage history, at least one of the first or second usage history providing units 232 and 233 may create a corresponding usage history and provide the created usage history to the display unit 210 in the set mode.

Figure 10:
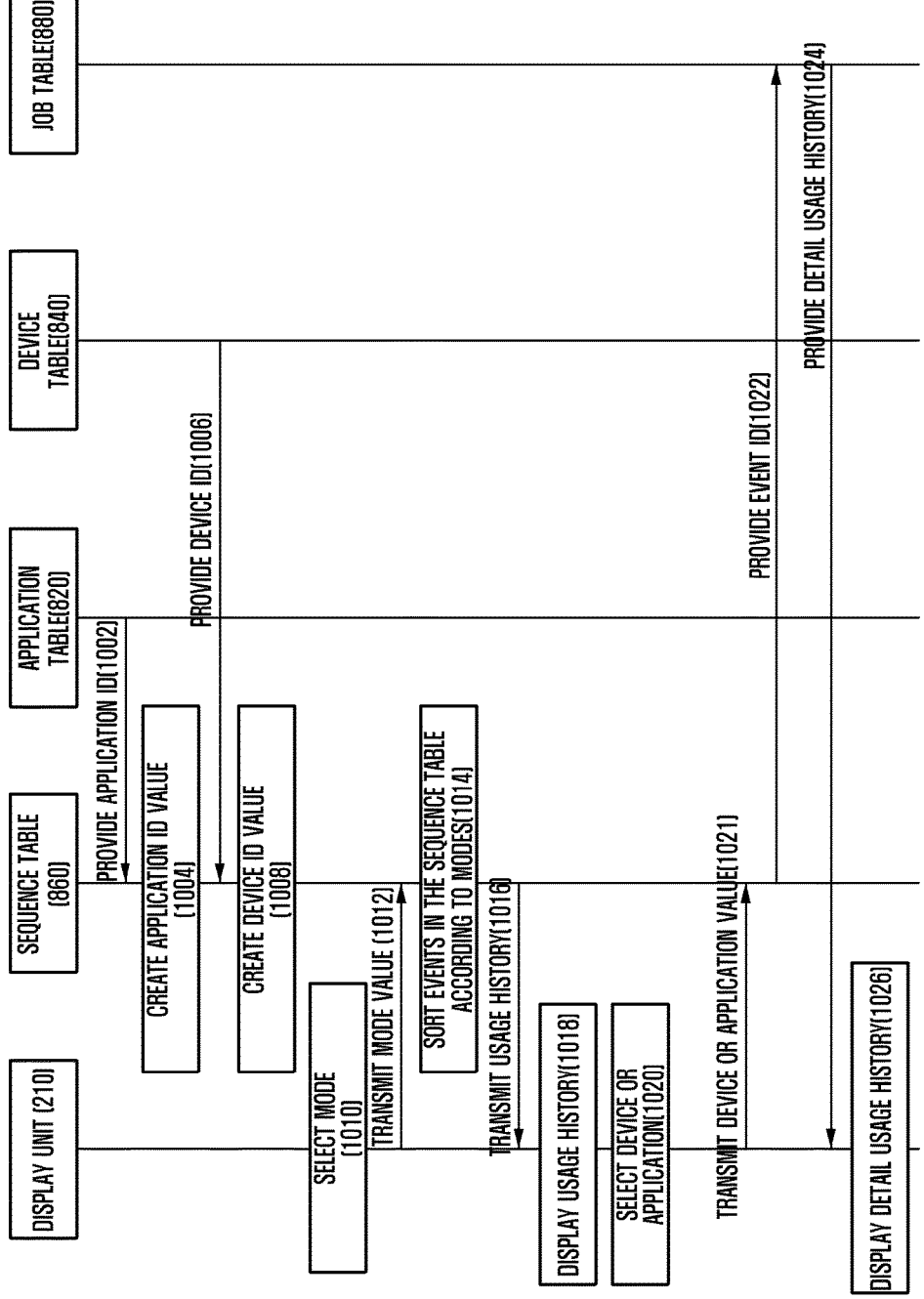
FIG. 10 is a flow chart illustrating a method for providing usage histories to a display unit, using usage history-related tables, according to an embodiment of the invention.

FIG. 10 is a flow chart illustrating a method for providing usage history to a display unit, using usage history-related tables, according to an embodiment of the present invention.

Referring to FIG. 10, when the first device 110 executes a number of applications through a connection with a number of devices, at least a part of the application table 820, the device table 840, and the sequence table 860 is created in the storage unit 250. The controller 230 provides an application ID in the application table 820 to the sequence table 860, in step 1002. The application ID is recorded in the application ID field in the sequence table 860, in step 1004. The controller 230 also provides a device ID in the device table 840 to the sequence table 860, in step 1006. The device ID is recorded in the device ID field in the sequence table 860, in step 1008.

When the user selects, on the display unit 210, one of the modes for displaying usage history of applications arranged by device or usage history of devices arranged by application, in step 1010, the signal corresponding to the user's selected mode is transferred to the controller 230, in step 1012.

The controller 230 sorts the records in the sequence table 860 according to the set mode, in step 1014. For example, the controller 230 sorts usage histories in the sequence table 860, with respect to device IDs, extracts application IDs corresponding to the device IDs, and creates usage histories of applications arranged by device. Alternatively, the controller 230 can also sort usage histories in the sequence table 860 with respect to application IDs, extracts device IDs corresponding to the application IDs, and creates usage histories of devices arranged by application. The controller 230 provides the usage history of applications arranged by device or the usage history of devices arranged by application, created according to the set mode, to the display unit 210, in step 1016.

The controller 230 controls the display unit 210 to display the usage history of applications arranged by device or the usage history of devices arranged by application, in step 1018. When the user selects a device or an application on the display unit 210, referring to the usage histories, in step 1020, the signal corresponding to the selected device or application is transferred to the controller 230, in step 1021. The controller 230 provides an event ID corresponding to an event that occurred when the device or application is selected referring to the sequence table 860, to the job table 880, in step 1022. After providing the event ID, the controller 230 searches the job table 880 for detailed usage history, using the event ID, and provides it to the display unit 210, in step 1024. The controller 230 controls the display unit 210 to display the detailed usage history, in step 1026.

FIGS. 11A to 11B are diagrams illustrating screens showing usage histories of applications arranged by device, according to an embodiment of the present invention.

Referring to FIGS. 11A and 11B, the usage histories of applications arranged by device are displayed on regions corresponding to each of the other devices in the screen of the display unit. FIG. 11A shows the usage histories of applications arranged by device on six regions arrayed in a 3×2 matrix, and FIG. 11B shows the usage histories of applications arranged by device on six regions arrayed in a 6×1 matrix. Meanwhile, as shown in FIG. 4, the screen area of a display unit may also be divided into four regions to display the usage histories of applications arranged by device. Accordingly, the screen area of the display unit may be divided into a number of regions to meet the number of devices with which the first device 110 executed applications. In addition, the number of regions may be set by a user's selection or preset as a default, in the first device 110.

FIGS. 12A to 12B are diagrams illustrating screens showing usage histories of devices arranged by application, according to an embodiment of the present invention.

Referring to FIGS. 12A and 12B, the usage histories of devices arranged by application are displayed on corresponding regions in the screen area of the display unit, which are divided into the number of executed applications. FIG. 12A shows the usage histories of devices arranged by application on six regions arrayed in a 3×2 matrix, and FIG. 12B shows the usage histories of devices arranged by application on six regions arrayed in a 6×1 matrix. Meanwhile, as shown in FIG. 6, the screen area of a display unit may also be divided into four regions to display the usage histories of devices arranged by application. Accordingly, the display unit may be divided into a number of regions to meet the number of applications that the first device 110 executed with the connection with corresponding devices. In addition, the number of regions may be set by a user's selection or preset as a default, in the first device 110.

Figure 13A:
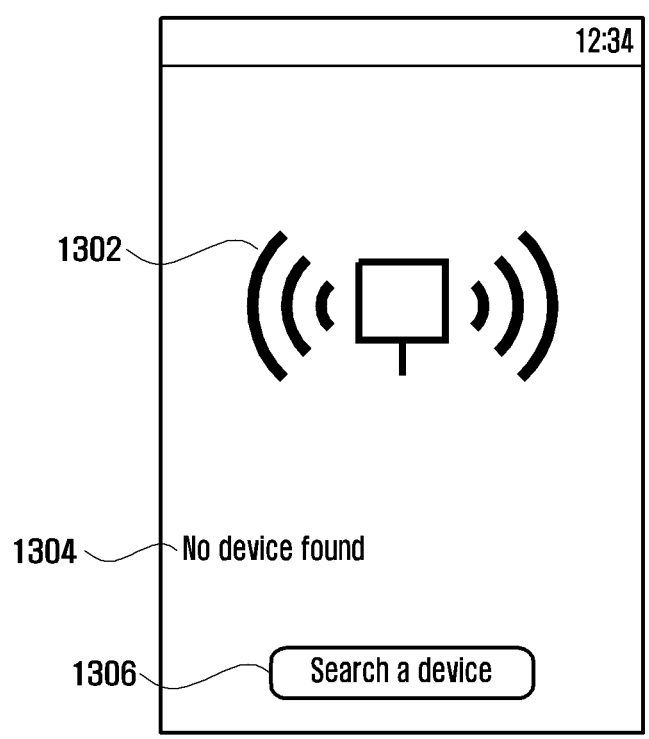
FIGS. 13A to 13B are diagrams illustrating screens showing that there is no usage history, according to an embodiment of the invention.
Figure 13B:
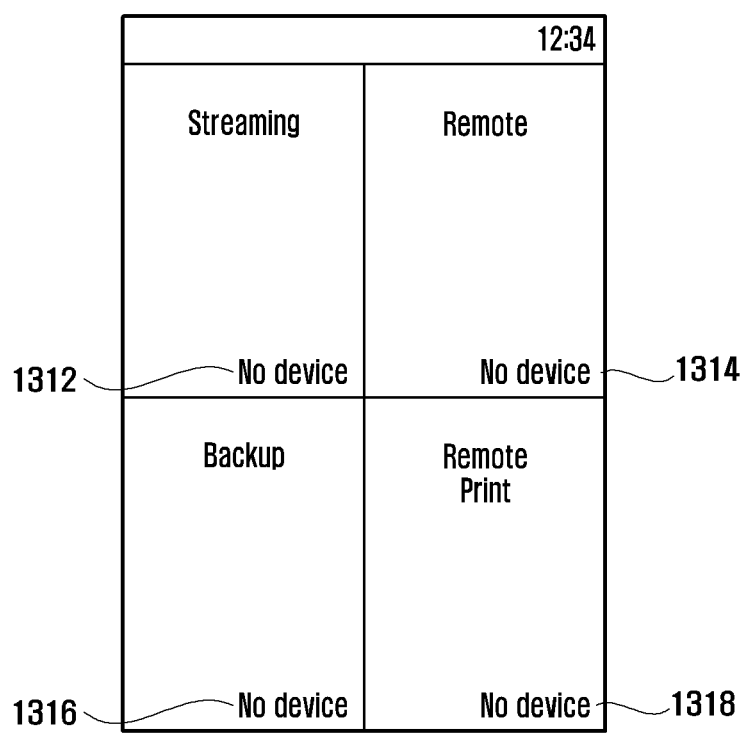

FIGS. 13A to 13B are diagrams illustrating screens showing that there is no usage history, according to an embodiment of the present invention.

Referring to FIG. 13A, a screen of the first device 110, which is set to display a usage history of applications by devices, is displayed. When the first device 110 is not currently connected with other devices via the network or execute any applications, relating with the other devices, the first device 110 displays the corresponding icon 1302 and/or text message 1304 on the display unit 210. During this process, the first device 110 may also display, on the display unit 210, a button 1306 for searching for new devices on the network.

Referring to FIG. 13B, a screen showing icons or text messages 1312, 1314, 1316, and 1318 indicating that the first device 110 has not executed any applications, relating with the other devices on the network, in a mode for displaying the usage history of devices arranged by application, is displayed.

Figure 14:
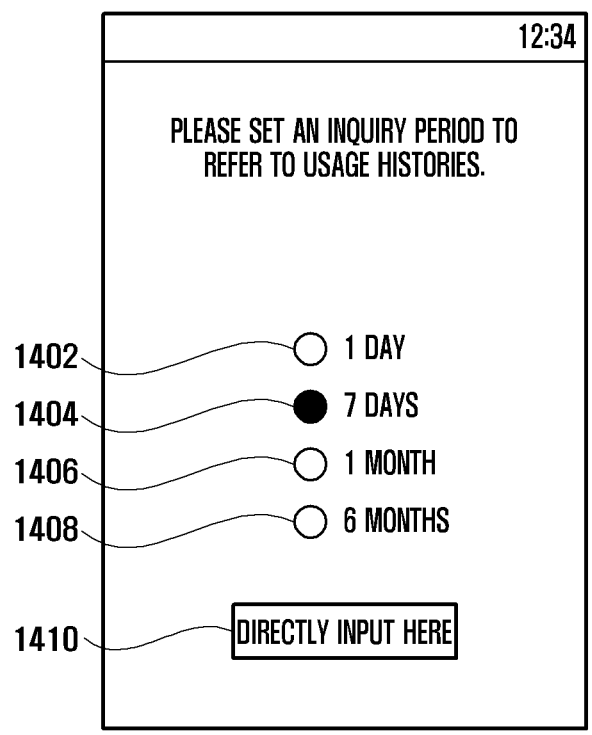
FIG. 14 is a diagram illustrating a screen showing a menu for setting an inquiry period for displaying usage histories, according to an embodiment of the invention.

FIG. 14 is a diagram illustrating a screen showing a menu for setting an inquiry period for displaying usage histories, according to an embodiment of the present invention.

Referring to FIG. 14, in order to display a usage history of applications arranged by device or usage history of devices arranged by application, the inquiry period within which the applications or the devices have been used is set in the first device 110. For example, as shown in FIG. 14, the user can set the inquiry period of usage history by selecting one of the periods '1 day', '7 days', '1 month', and '6 months', via the corresponding radio buttons 1402, 1404, 1406, and 1408, respectively. Alternatively, the user can set the inquiry period by directly input a period of time to a text inputting field 1410. The inquiry period may be set by a user's selection or preset in the first device 110.

Figure 15:
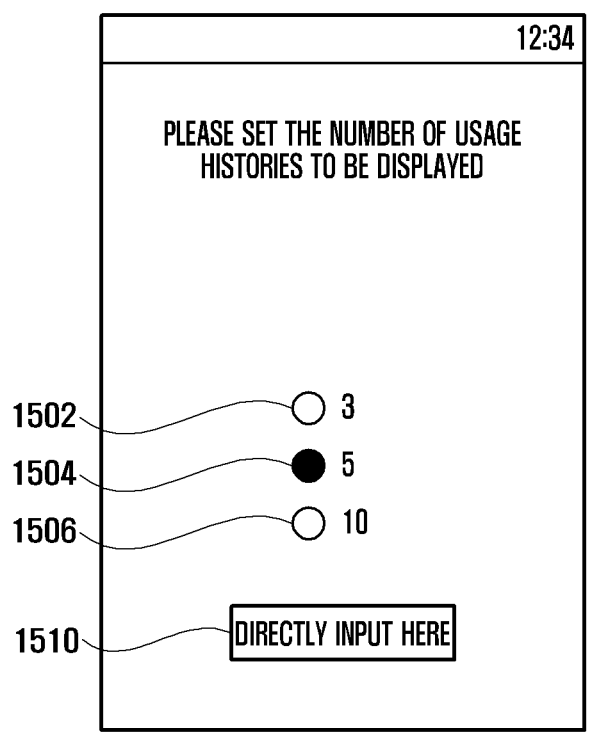
FIG. 15 is a diagram illustrating a screen showing a menu for setting the number of usage histories to be displayed, according to an embodiment of the invention.

FIG. 15 is diagram illustrating a screen showing a menu for setting the number of usage histories to be displayed, according to an embodiment of the present invention.

Referring to FIG. 15, in order to display a usage history of applications arranged by device or a usage history of devices arranged by application, the number of usage histories of applications arranged by device or of devices arranged by application to be displayed within each region may be set in the first device 110. For example, as shown in FIG. 15, the user can set the number of usage histories by selecting one of the numerals, 3, 5, and 10, via the corresponding radio buttons 1502, 1504, and 1506, respectively. Alternatively, the user can set the number of usage histories by directly inputting a number to a text inputting field 1510. The number of usage histories may be set by a user's selection or preset in the first device 110.

Figure 16:
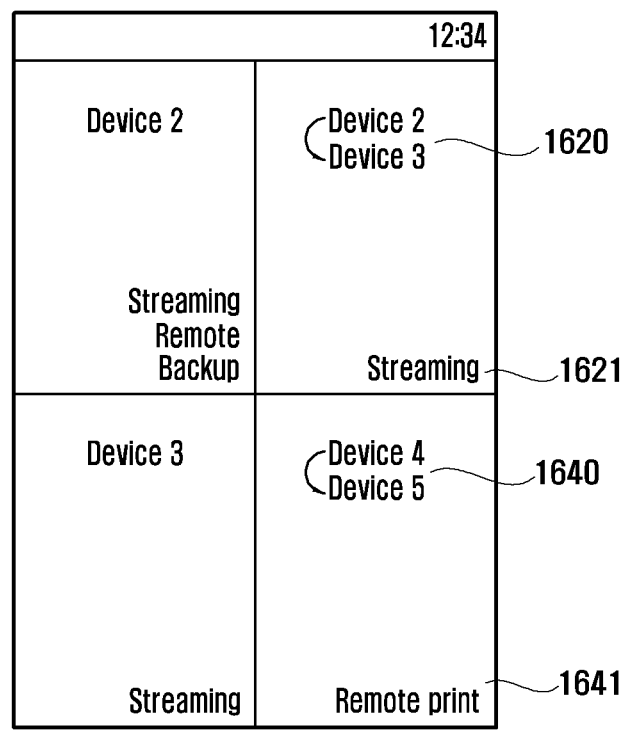
FIG. 16 is a diagram illustrating a screen showing usage histories of applications arranged by device, according to an embodiment of the invention.

FIG. 16 is a diagram illustrating a screen showing usage histories of applications arranged by device, according to an embodiment of the present invention.

Referring to FIG. 16, the usage history of applications arranged by device may include the usage history of applications that the first device 110 remotely executed, with respect to the other devices. During the remote controlling operation, the first device 110 serves as a DMC and transmits digital contents in a DMS to a DMR.

Region 1620 shows the usage history of the second and third devices 120 and 130 that the first device 110 remotely controlled. Detailed usage history 1621 indicates that the first device 110 remotely controls the second and third devices 120 and 130 in such a way that digital contents, stored in the second device 120, are reproduced in the third device 130 in a streaming mode.

Region 1640 shows the usage history of the fourth and fifth devices 140 and 150 that the first device 110 remotely controls. Detailed usage history 1641 indicates that the first device 110 remotely controls the fourth and fifth devices 140 and 150 in such a way that data, processed in the fourth device 140, is printed via the fifth device 150.

Figure 17:
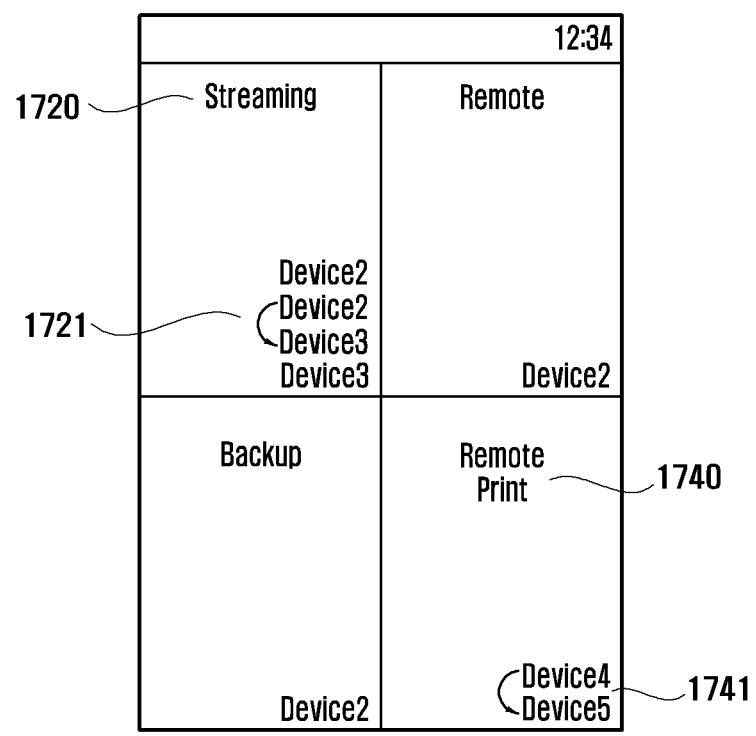
FIG. 17 is a diagram illustrating a screen showing usage histories of devices arranged by application, according to an embodiment of the invention.

FIG. 17 is a diagram illustrating a screen showing usage histories of devices arranged by application, according to an embodiment of the present invention.

Referring to FIG. 17, the usage history of devices arranged by application includes the usage history of devices that the first device 110 remotely connects to and controls, with respect to applications. During the remote controlling operation, the first device 110 serves as a DMC and transmits digital contents in a DMS to a DMR.

Region 1720 shows the usage history of devices that the first device 110 remotely connects to and controls when executing a streaming application. Detailed usage history 1721 indicates that the first device 110 remotely controls the second and third devices 120 and 130 in such a way that digital contents, stored in the second device 120, are reproduced in the third device 130 in a streaming mode.

Region 1740 shows the usage history of devices that the first device 110 remotely connects to and controls when executing a remote print application. Detailed usage history 1741 indicates that the first device 110 remotely controls the fourth and fifth devices 140 and 150 in such a way that the data, processed in the fourth device 140, is printed via the fifth device 150.

FIG. 18 is a diagram illustrating a table describing usage histories of a device, according to an embodiment of the present invention.

FIG. 18 shows a sequence table listing events and the sequence occurring, for example, when digital contents are transmitted between the first device 110 and the other devices or between the other devices, according to the remote control of the first device 110. The sequence table 1810 includes events 1812, 1814, and 1816, as records, and each record has an event ID, an application execution time, an application ID, a device ID that transmits digital contents, and a device ID that receives digital contents. For example, referring to FIG. 18, event 1812 of event ID '1' indicates that the first device 110 executes an application having an application ID of '1', at time 12:00:00, and transmits digital contents from a device having a device ID of '2', to a device having a device ID of '3'. Referring to application table 820 and device table 840, event 1812 indicates that the first device 110 performs a remote control operation and transmits digital contents from a device, i.e., Myphone, to a device (e.g., a Galaxy Tab), in a streaming mode.

Figure 19:
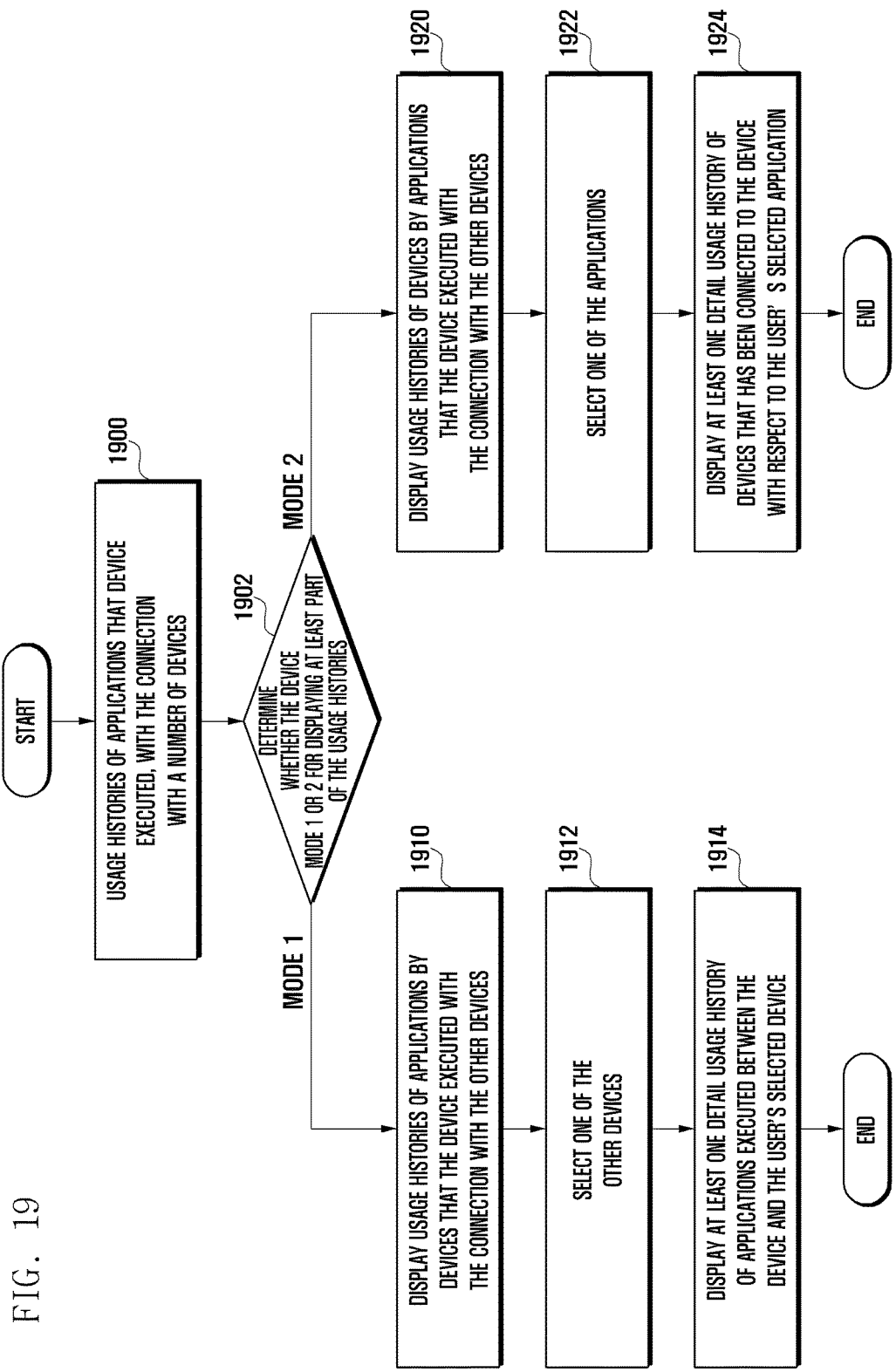
FIG. 19 is a flow chart illustrating a method for operating an application usage history system between devices, according to an embodiment of the present invention.

FIG. 19 is a flow chart illustrating methods for operating an application usage history system between devices, according to an embodiment of the present invention.

Referring to FIG. 19, the first device 110 stores usage histories of applications that the first device 110 has executed, with the connection with a number of devices, in step 1900. The first device 110 sets mode 1 or mode 2 in order to display at least part of the usage histories, in step 1902. For example, the first device 110 may set to mode 1 or mode 2 according to a user's selection.

When the first device 110 is set to mode 1 at step 1902, the first device 110 displays usage histories of applications arranged according to devices that the first device 110 has executed with the connection with a number of devices, in step 1910. If the user selects one of a number of devices, in step 1912, the first device 110 displays at least one detailed usage history of applications executed between the first device 110 and the user's selected device, in step 1914.

However, when the first device 110 is set to mode 2 at step 1902, the first device 110 displays usage histories of devices arranged according to applications that the first device 110 executed with the connection with a number of devices, in step 1920. If the user selects one of the applications, in step 1922, the first device 110 displays at least one detailed usage history of devices that has been connected to the first device 110, with respect to the user's selected application, in step 1924.

Figure 20:
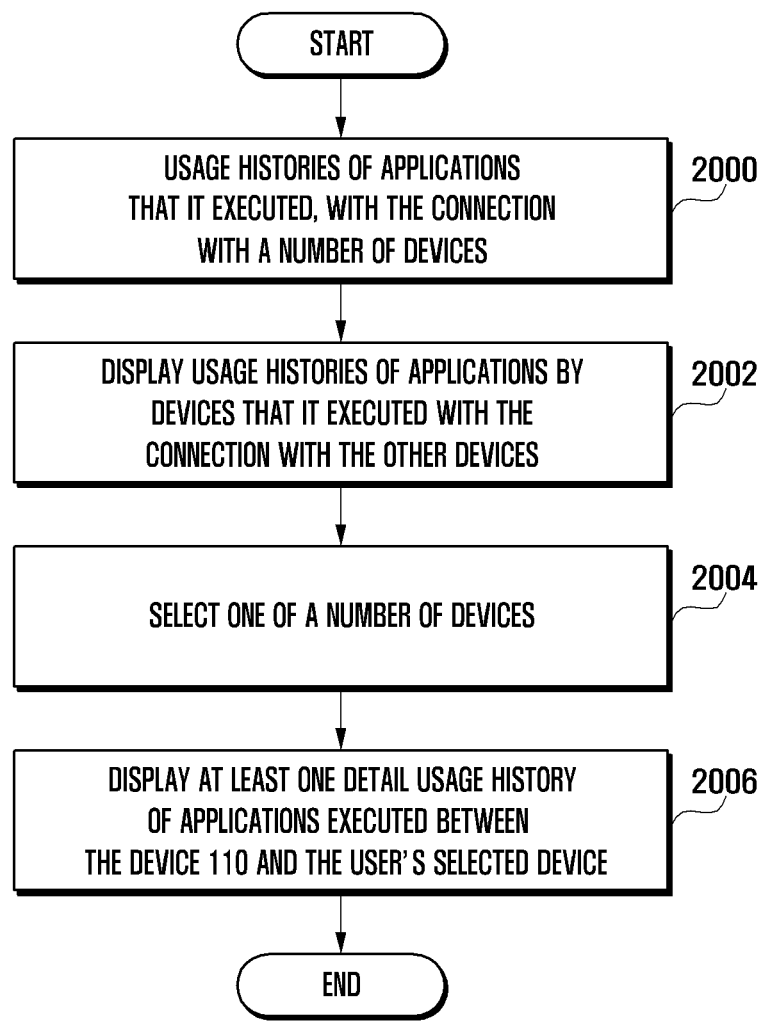
FIG. 20 is a flow chart illustrating another method for operating an application usage history system between devices, according to an embodiment of the present invention.

FIG. 20 is a flow chart illustrating another method for operating an application usage history system between devices, according to an embodiment of the present invention.

Referring to FIG. 20, the first device 110 stores usage histories of applications that the first device 110 has executed, with the connection with a number of devices, in step 2000. The first device 110 displays usage histories of applications arranged according to devices that the first device 110 has executed with the connection with the other devices, in step 2002. If the user selects one of a number of devices, in step 2004, the first device 110 displays at least one detailed usage history of applications executed between the first device 110 and the user's selected device, in step 2006.

Figure 21:
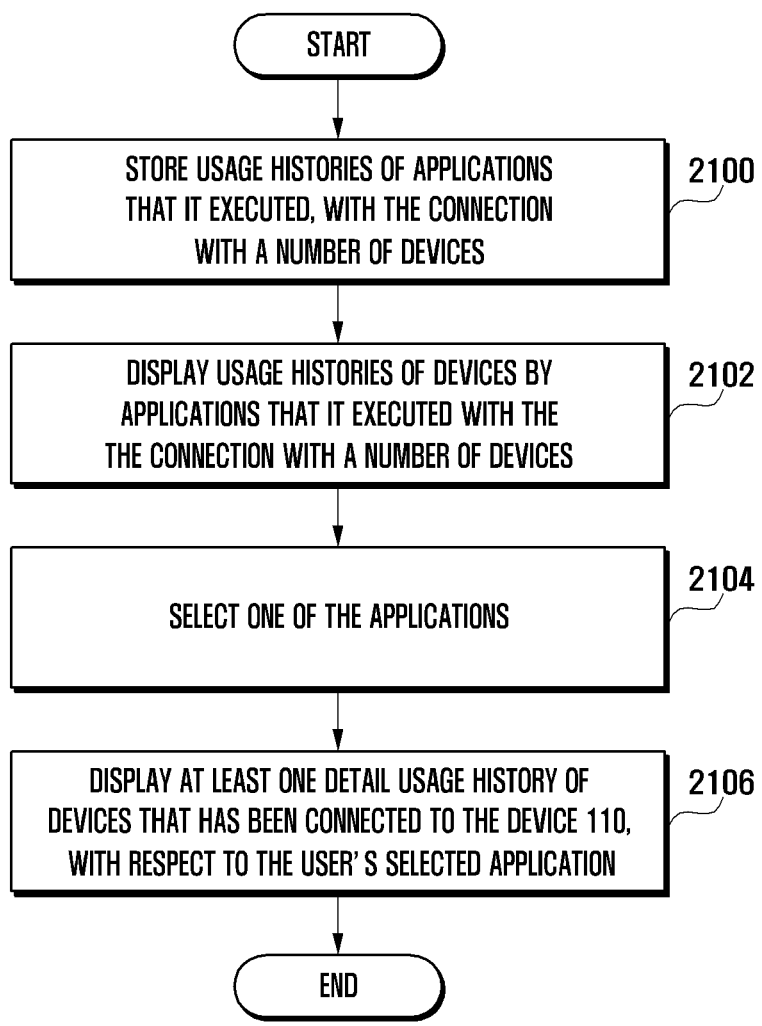
FIG. 21 is a flow chart illustrating another method for operating an application usage history system between devices, according to another embodiment of the present invention.

FIG. 21 is a flow chart illustrating another method for operating an application usage history system between devices, according to another embodiment of the present invention.

Referring to FIG. 21, the first device 110 stores usage histories of applications that the first device 110 has executed, with the connection with a number of devices, in step 2100. The first device 110 displays usage histories of devices arranged according to applications that the first device 110 has executed with the connection with a number of devices, in step 2102. If the user selects one of the applications, in step 2104, the device 110 displays at least one detailed usage history of devices that has been connected to the first device 110, with respect to the user's selected application, in step 2106.

Figure 22:
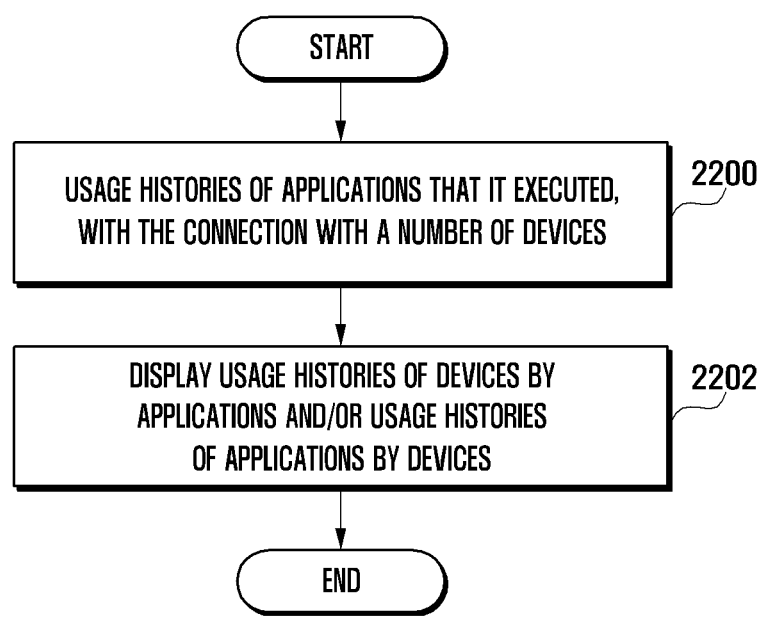
FIG. 22 is a flow chart illustrating another method for operating an application usage history system between devices, according to another embodiment of the present invention.

FIG. 22 is a flow chart that illustrating another method for operating an application usage history system between devices, according to another embodiment of the present invention.

Referring to FIG. 22, the first device 110 stores usage histories of applications that the first device 110 has executed, with the connection with a number of devices, in step 2200. The first device 110 displays usage histories of devices arranged by application and/or usage histories of applications arranged by device, in step 2202.

As described above, the system and method according to embodiments of the present invention can reduce the number of jobs to be repeatedly performed, by using a usage history of a number of applications executed in a number of devices, thereby rapidly executing the user's requested jobs between the devices. The system and method can also display a usage history of a number of applications executed in a number of devices, so that the user can instinctively recognize the usage states of a number of devices and a number of applications.

As described above, the usage history displaying system and method according to embodiments of the present the invention can be implemented with program commands that can be conducted via various types of computers and recorded in computer-readable recording media. The computer-readable recording media contain program commands, data files, data structures, or the like, or a combination thereof. The program commands recorded in the recording media may be designed or configured to comply with the invention or may be software well-known to the ordinary person skilled in the art. The computer-readable recoding media includes hardware systems for storing and conducting program commands. Examples of such hardware systems are magnetic media such as a hard disk, floppy disk, a magnetic tape, optical media such as Compact Disc (CD)—Read Only Memory (ROM) and Digital Versatile Disc (DVD), magneto-optical media, such as floptical disk, Read-Only Memory (ROM), Random Access Memory (RAM), flash memory, etc. The program commands include assembly language or machine code complied by a complier and a higher-level programming language interpreted by an interpreter. The hardware systems may be implemented with at least one software module in accordance with embodiments of the present invention.

Although embodiments of the invention have been described in detail hereinabove, many variations and modifications of the basic inventive concept herein described, which may be apparent to those skilled in the art, will still fall within the spirit and scope of the invention as defined by the appended claims.

What is claimed is:

1. A method for displaying usage histories of applications executed by devices on a network, the method comprising:
   storing usage histories of applications, in a first device, that the first device has executed with a plurality of other devices through a network connection;
   setting, in the first device, at least one of a first mode and a second mode for displaying at least a part of the usage histories stored in the first device;
   when the first device is set in the first mode, displaying usage histories of the executed applications arranged by device, with respect to the plurality of other devices and, when one of the plurality of other devices is selected from the display usages histories of the executed applications, displaying detailed usage histories of at least one application executed between the first device and the selected device; and when the first device is set in the second mode, displaying usage histories of the plurality of other devices arranged by application, with respect to the executed applications.

2. The method of claim 1, further comprising:
displaying at least one of the usage histories of the executed applications arranged by device and the usage histories of the plurality of other devices arranged by application on respective regions into which a screen area of the first device is divided.

3. The method of claim 2, further comprising:
setting a number of regions; and
displaying at least one of the usage histories of the executed applications arranged by device and the usage histories of the plurality of other devices arranged by application, within the set number of regions.

4. The method of claim 1, further comprising:
setting an inquiry period to display at least one of the usage histories of the executed applications arranged by device and usage histories of the plurality of other devices arranged by application; and
displaying at least one of usage histories of the executed applications arranged by device and usage histories of the plurality of other devices arranged by application, used for the set inquiry period.

5. The method of claim 1, further comprising:
setting a number of usage histories to be displayed; and
displaying at least one of the usage histories of the executed applications arranged by device and the usage histories of the plurality of other devices arranged by application, within the set number of usage histories.

6. The method of claim 1, further comprising:
selecting one of the applications executed between the first device and the plurality of other devices; and
displaying detailed usage histories of at least one device connected to the first device, with respect to the selected application.

7. A method for displaying usage histories of applications executed by devices on a network, the method comprising:
storing usage histories of applications, in a first device, that the first device has executed with a plurality of other devices through a network connection;
displaying usage histories of the executed applications arranged by device, with respect to the plurality of other devices;
selecting one of the plurality of other devices from the displayed usage histories of the executed applications; and
displaying detailed usage histories of at least one application executed between the first device and the selected device.

8. A method for displaying usage histories of applications executed by devices on a network, the method comprising:
storing usage histories of applications, in a first device, that the first device executed with a plurality of other devices through a network connection;
displaying usage histories of the plurality of other devices arranged by application, with respect to the executed applications;
selecting one of the executed applications from the displayed usage histories of the plurality of other devices; and
displaying detailed usage histories of at least one device connected to the first device, with respect to the selected application.

9. A method for displaying usage histories of applications executed by devices on a network, the method comprising:
storing usage histories of applications, in a first device, that the first device executed with a plurality of other devices through a network connection;
displaying at least one of usage histories of the executed applications arranged by device, with respect to the plurality of other devices and usage histories of the plurality of other devices arranged by application, with respect to the executed applications; and
when one of the plurality of other devices is selected from the displayed usage histories of the executed applications, displaying detailed usage histories of at least one application executed between the first device and the selected device.

10. A system for displaying usage histories of applications executed by devices on a network, the system comprising:
a storage unit for storing the usage histories of applications, in a first device, that the first device has executed with a plurality of other devices over a network connection;
a controller for:
setting one of a first mode and a second mode for displaying at least part of the usage histories stored in the first device on the first device,
providing, in the first mode, the usage histories of the executed applications arranged by device, with respect to the plurality of other devices and, when one of the plurality of other devices is selected from the provided usage histories of the executed applications, providing detailed usage histories of at least one application executed between the first device and the selected device, and
providing, in the second mode, the usage histories of the plurality of other devices arranged by application, with respect to the executed applications; and
a display unit for displaying at least one of the usage histories of the executed applications arranged by device, the usage histories of the plurality of other devices arranged by application, and the detailed usage histories.

11. The system of claim 10, wherein the display unit displays at least one of the usage histories of the executed applications arranged by device and the usage histories of the plurality of other devices arranged by application on divided regions, respectively.

12. The system of claim 11, wherein the controller sets a number of regions and controls display of at least one of the usage histories of the executed applications arranged by device or the usage histories of the plurality of other devices arranged by application, within the set number of regions.

13. The system of claim 10, wherein the controller sets an inquiry period and controls display of at least one of the usage histories of the executed applications arranged by device and the usage histories of the plurality of other devices arranged by application, used for the set inquiry period.

14. The system of claim 10, wherein the controller sets a number of usage histories to be displayed and controls display of at least one of the usage histories of the executed applications arranged by device and the usage histories of the plurality of other devices arranged by application, within the set number of usage histories.

15. A system for displaying usage histories of applications executed by devices on a network, the system comprising:
a storage unit for storing usage histories of applications, in a first device, that the first device has executed with a plurality of other devices through a network connection;

a controller for providing usage histories of the executed applications arranged by device, with respect to the plurality of other devices and detailed usage histories of at least one application executed between the first device and one device selected from the plurality of other devices in the provided usage histories of the executed applications; and a display unit for displaying the usage histories and the detailed usage histories.

16. A system for displaying usage histories of applications executed by devices on a network, the system comprising:

a storage unit for storing usage histories of applications, in a first device, that the first device has executed with a plurality of other devices through a network connection;

a controller for providing usage histories of the plurality of other devices arranged by application, with respect to the executed applications, and detailed usage histories of at least one device connected to the first device, with respect to one application selected from the executed applications in the provided usage histories of the plurality of other devices; and a display unit for displaying the usage histories and the detailed usage histories.

17. A system for displaying usage histories of applications executed by devices on a network, the system comprising:

a storage unit for storing usage histories of applications, in a first device, that the first device executed with a plurality of other devices through a network connection;

a controller for:

providing at least one of usage histories of the executed applications arranged by device, with respect to the plurality of other devices and usage histories of the plurality of other devices arranged by application, with respect to the executed applications, and when one of the plurality of other devices is selected from the provided usage histories of the executed applications, providing detailed usage histories of at least one application executed between the first device and the selected device; and a display unit for displaying the provided usage histories.

18. A non-transitory computer-readable recording medium on which is recorded a program for displaying usage history of application executed by devices on a network, the program comprising:

storing usage histories of applications, in a first device, that the first device executed with a plurality of other devices through a network connection;

displaying at least one of usage histories of the executed applications arranged by device, with respect to the plurality of other devices and usage histories of the plurality of other devices arranged by application, with respect to the executed applications; and when one of the plurality of other devices is selected from the displayed usage histories of the executed applications, displaying detailed usage histories of at least one application executed between the first device and the selected device.

* * * * *